(No Model.)
Z. BREED.
WEEDER.
No. 354,625. Patented Dec. 21, 1886.
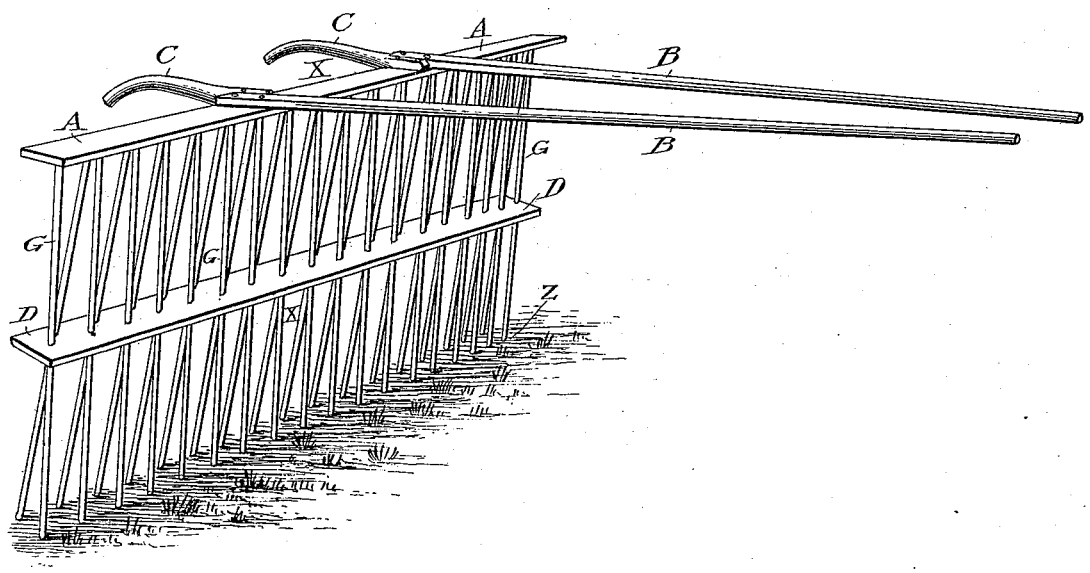
Witnesses:
Mabel P. Hyman
Jennie F. Breed
Inventor:
Zephaniah Breed

UNITED STATES PATENT OFFICE.

ZEPHANIAH BREED, OF WEARE, ASSIGNOR OF ONE-HALF TO J. EDWARD JONES, OF SAME PLACE, AND WILLIAM H. M. CATE, OF HENNIKER, N. H.

WEEDER.

SPECIFICATION forming part of Letters Patent No. 354,625, dated December 21, 1886.

Application filed May 20, 1885. Serial No. 166,205. (No model.)

*To all whom it may concern:*

Be it known that I, ZEPHANIAH BREED, a citizen of the United States, residing at Weare, in the county of Hillsborough and State of New Hampshire, have invented an Improvement in Cultivators or Weeders, of which the following is a specification.

My invention consists of a series of long and flexible teeth or fingers inserted in two lines into a head above and passing downward through a check-bar, which may be made adjustable vertically.

The accompanying drawing represents a perspective view of my weeder, the long teeth G being inserted into the head A and passing downward through the check-bar D, said teeth being flexible both above and below said check-bar, so as to pass around small stones, corn-roots, and other obstructions without clogging or breaking.

Attached to the head A are the thills B, for attaching a horse to the machine, said thills being extended backward to form handles, to enable the workman to manage the machine.

The fingers G have some play in the holes through the check-bar D, so that the fingers are very flexible, and work somewhat resembling the human fingers in stirring the ground, especially when the machine is gently shaken by the workman. This flexibility and play of the teeth or fingers render them less liable to be broken in passing obstructions.

The whole machine may be made of wood, including the fingers, which may have metal thimbles on the points, or the whole machine may be made of metal, if desired, the thills being made tubular, for the purpose of lightness and strength. By the arrangement of the teeth the surface of the ground is twice moved by one passage of the machine, without any lap, and by the workman giving a slight motion of the machine to right and left the dirt is effectually loosened from the roots of the weeds.

My weeder is also a practical leveler for grain-fields and effective in raking in grass-seed. By lowering the check-bar on the fingers the lower ends of the same have less flexibility and are held more rigidly, and thus better adapted for working hard ground.

Having thus described my invention, I claim—

The described weeder having long straight fingers G, with their upper end inserted into head A, and provided with an adjustable check bar, D, for increasing or diminishing the flexibility of said fingers below said check-bar, substantially as set forth.

ZEPHANIAH BREED.

Witnesses:
LUCY H. JONES,
MARY B. BREED.